United States Patent
Higuchi et al.

(10) Patent No.: US 12,354,477 B2
(45) Date of Patent: Jul. 8, 2025

(54) SYSTEMS AND METHODS FOR ACTIVATION OF INTELLIGENT PARKING AVAILABILITY FUNCTIONS

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US); Derek S. Caveney, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 503 days.

(21) Appl. No.: 17/544,451

(22) Filed: Dec. 7, 2021

(65) Prior Publication Data

US 2023/0177958 A1    Jun. 8, 2023

(51) Int. Cl.
 *G08G 1/14* (2006.01)
 *G01C 21/36* (2006.01)

(52) U.S. Cl.
 CPC ......... *G08G 1/147* (2013.01); *G01C 21/3685* (2013.01); *G08G 1/143* (2013.01)

(58) Field of Classification Search
 CPC ........ G01C 21/00; G01C 21/26; G01C 21/34; G01C 21/38; G01C 21/36; G01C 21/3679;
(Continued)

(56) References Cited

U.S. PATENT DOCUMENTS

| 9,637,117 B1 | 5/2017 | Gusikhin et al. |
| 10,234,868 B2 | 3/2019 | Lavoie et al. |

(Continued)

FOREIGN PATENT DOCUMENTS

EP    3559895 A1    12/2017

OTHER PUBLICATIONS

Higuchi, T. et al., "A Collaborative Approach to Finding Available Parking Spots", Research Gate, <https://www.researchgate.net/publication/336459262>, Sep. 2019.
(Continued)

*Primary Examiner* — Khoi H Tran
*Assistant Examiner* — Sarah A Tran
(74) *Attorney, Agent, or Firm* — Christopher G. Darrow; Darrow Mustafa PC

(57) ABSTRACT

Systems, methods, and other embodiments described herein relate to improving identification of available parking spaces in congested zones. In one embodiment, a method includes, responsive to receiving trajectory information about movement of a searching vehicle, estimating a search time spent by the vehicle seeking parking in a location. The method includes aggregating, when the search time satisfies a time threshold, the search time with observed times associated with additional entities parking in the location. The method includes updating a parking map according to the observed times when the observed times satisfy a parking threshold indicating a lack of available parking in the location. The parking map identifies active regions where parking is presently lacking. The method includes providing the parking map with the active regions to identified vehicles proximate to locations associated with the active regions.

19 Claims, 7 Drawing Sheets

(58) Field of Classification Search
CPC ............ G01C 21/3685; G01C 21/3804; G01C 21/3807; G01C 21/3815; G01C 21/3819; G01C 21/3822; G08G 1/00; G08G 1/01; G08G 1/0104; G08G 1/0108; G08G 1/0125; G08G 1/09; G08G 1/0962; G08G 1/0968; G08G 1/14; G08G 1/145; G08G 1/143; G08G 1/147; G08G 1/0112; G08G 1/0129; G08G 1/0133; G08G 1/0141; G08G 1/146; G08G 1/148; G08G 1/141; G08G 1/0137; G08G 1/0969
See application file for complete search history.

(56) References Cited

U.S. PATENT DOCUMENTS

| | | | |
|---|---|---|---|
| 10,527,433 | B2 | 1/2020 | Baughman et al. |
| 11,011,058 | B2 | 5/2021 | Krivacic et al. |
| 11,081,004 | B1 | 8/2021 | Higuchi et al. |
| 2016/0117925 | A1 | 4/2016 | Akavaram et al. |
| 2016/0379329 | A1* | 12/2016 | Amir ................ G06Q 50/40 705/13 |
| 2018/0204465 | A1* | 7/2018 | Tong ................ G06N 7/01 |
| 2019/0258960 | A1 | 8/2019 | Pinel et al. |
| 2020/0202716 | A1* | 6/2020 | Edwards .......... G08G 1/096855 |
| 2020/0394914 | A1 | 12/2020 | Higuchi et al. |
| 2020/0410861 | A1* | 12/2020 | Nellros ............ G08G 1/143 |
| 2021/0319697 | A1 | 10/2021 | Higuchi et al. |

OTHER PUBLICATIONS

Higuchi, T. et al., "Monitoring Live Parking Availability by Vision-based Vehicular Crowdsensing," in Proceedings of 2020 IEEE Global Communications Conference (GLOBECOM), 2020.

* cited by examiner

SYSTEMS AND METHODS FOR ACTIVATION OF INTELLIGENT PARKING AVAILABILITY FUNCTIONS

TECHNICAL FIELD

The subject matter described herein relates, in general, to improving the identification of parking availability, and, more particularly, to tracking parking activity of vehicles to identify active regions that lack parking and selectively activating parking availability functions in vehicles within the active regions.

BACKGROUND

Parking a vehicle, especially within congested urban areas, can be a time-consuming task. For example, a driver is often tasked with finding parking without knowledge of whether parking within a location is even available. That is, a vehicle may proceed to a desired destination without knowledge of the availability of parking at the destination, including entering a parking garage, a parking lot, etc., without knowing whether the destination includes any available spots. Even still, if such parking locations are nearly full, finding an available spot can prove to be a task that involves an extended period of time searching for a spot, which is generally undesirable. As such, attempts to park in congested locations can be time-consuming and generally inefficient as drivers circle parking garages and other locations on the hunt for an available parking space.

SUMMARY

In various embodiment, example systems and methods relate to a manner of improving the identification of available parking spaces by better tracking parking availability through selective activation of parking availability tracking in connected vehicles. As previously noted, locating parking can be a time-consuming task that can result in delaying the arrival of a driver and general frustration for the driver when attempting to locate available spaces within a busy location. While some parking garages and parking lots may include infrastructure-based systems to identify available parking spots, such systems are generally expensive and complex to install and maintain. Moreover, connected vehicles can scan parking areas and identify available parking spots to a cloud-based system that communicates with vehicles seeking parking; however, the connected vehicles consume considerable resources (e.g., computational resources, energy, communication bandwidth, etc.) when continuously providing such functions.

Therefore, in one or more embodiments, an inventive system is disclosed that improves the identification of available parking spaces by better focusing resources of connected vehicles within areas lacking available parking. For example, in at least one arrangement, a parking system acquires information about vehicles traveling throughout a geographic area. In general, the information includes at least coarse trajectory data along with location information about the movements of the vehicle. Of course, in further arrangements, the information may include additional data, such as telematics data indicating more particular aspects of the operation of the vehicle (e.g., vehicle on/off, operating conditions, speeds, etc.).

In any case, the parking system receives the noted information from vehicles moving throughout a geographical region and analyzes the information to identify locations that lack available parking. The parking system may achieve this determination by deriving parking search times from the trajectory information. As one example, the parking system analyzes the information to identify when a vehicle starts searching and stops searching for a parking spot. The parking system may use different identifying characteristics depending on the particular pattern exhibited by the vehicle. For example, the parking system, in one approach, uses a time at which the vehicle is within a predefined distance of a destination, while, in further approaches, the parking system identifies the start time from when the vehicle enters a parking garage/lot, when the movement of the vehicle exhibits circling patterns, and so on. Additionally, the parking system determines the end time, in one approach, by determining when the vehicle stops moving for a defined period of time (e.g., 10 mins). In further approaches, the parking system determines the end time according to a vehicle off event, a transmission shifting to park, and so on.

Accordingly, the parking system may determine whether the search times satisfy a time threshold (e.g., >10 mins) that is indicative of a difficulty parking. If so, then the parking system can aggregate the search time as a parking event for an associated location. Thereafter, the parking system may check whether a particular location satisfies a parking threshold. The parking threshold indicates whether parking at the location is reaching a number of available spots that the location can be considered difficult to park. For example, in order to avoid spurious events and ensure proper characterization of a location, the parking threshold indicates a number of parking events over a sliding time window or an average parking search time over the sliding window.

As such, when the parking system determines that a location satisfies the parking threshold, the parking system, in one or more arrangements, updates active regions of a parking map and provides the parking map to connected vehicles within a geographic area. Thus, when a region is active within the parking map, connected vehicles within the active regions enable parking identification functions. The parking identification functions generally involve activating sensors within the connected vehicles to scan for available parking spaces, which consumes additional resources. However, because the parking system limits the activation of the parking identification functions to the active regions, the connected vehicles can better focus resources and avoid wasting resources by continuously enabling such functions. In any case, the connected vehicles can then communicate locations of available parking to the parking system, which shares the information with other vehicles to better facilitate parking in congested zones/locations. In this way, the parking system improves the identification of parking availability by focusing resources on areas in which additional parking information is needed.

In one embodiment, a parking system for improving the identification of available parking spaces in congested zones is disclosed. The parking system includes one or more processors and a memory communicably coupled to the one or more processors. The memory stores a control module including instructions that, when executed by the one or more processors, cause the one or more processors to, responsive to receiving trajectory information about the movement of a searching vehicle, estimate a search time spent by the searching vehicle seeking parking in a location. The control module includes instructions to aggregate when the search time satisfies a time threshold, the search time with observed times associated with additional entities parking in the location. The control module includes instructions to update a parking map according to the observed times when the observed times satisfy a parking threshold indicating a lack of available parking in the location. The parking map identifies active regions where parking is presently lacking. The control module includes instructions to provide the parking map with the active regions to identified vehicles proximate to locations associated with the active regions.

In one embodiment, a non-transitory computer-readable medium for improving identification of available parking spaces in congested zones and including instructions that, when executed by one or more processors, cause the one or more processors to perform one or more functions is disclosed. The instructions include instructions to, responsive to receiving trajectory information about the movement of a searching vehicle, estimate a search time spent by the searching vehicle seeking parking in a location. The instructions include instructions to aggregate, when the search time satisfies a time threshold, the search time with observed times associated with additional entities parking in the location. The instructions include instructions to update a parking map according to the observed times when the observed times satisfy a parking threshold indicating a lack of available parking in the location. The parking map identifies active regions where parking is presently lacking. The instructions include instructions to provide the parking map with the active regions to identified vehicles proximate to locations associated with the active regions.

In one embodiment, a method for improving identification of available parking spaces in congested zones is disclosed. In one embodiment, the method includes, responsive to receiving trajectory information about movement of a searching vehicle, estimating a search time spent by the vehicle seeking parking in a location. The method includes aggregating, when the search time satisfies a time threshold, the search time with observed times associated with additional entities parking in the location. The method includes updating a parking map according to the observed times when the observed times satisfy a parking threshold indicating a lack of available parking in the location. The parking map identifies active regions where parking is presently lacking. The method includes providing the parking map with the active regions to identified vehicles proximate to locations associated with the active regions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
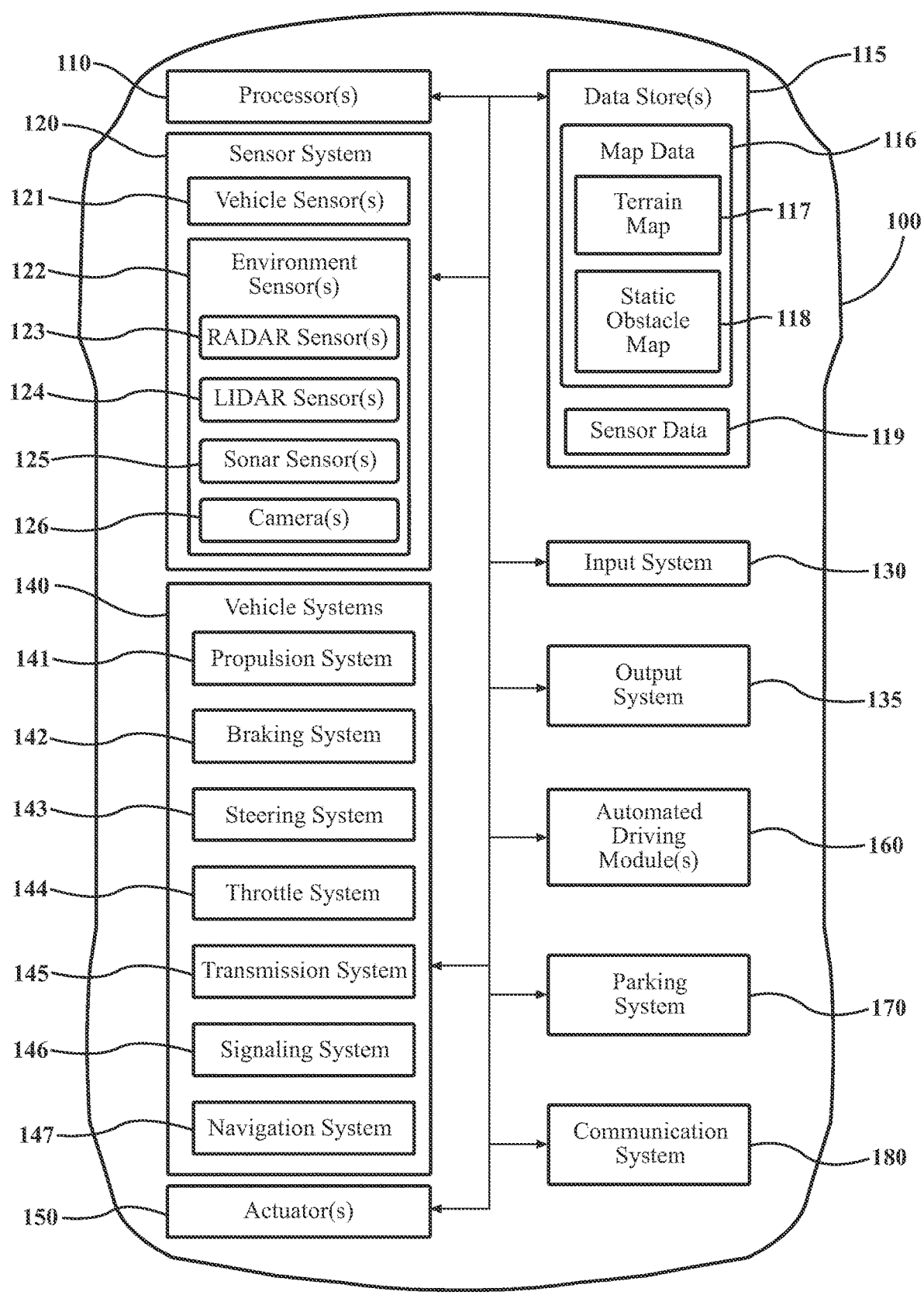
FIG. 1 illustrates one embodiment of a vehicle within which systems and methods disclosed herein may be implemented.

Systems, methods, and other embodiments associated with a manner of improving the identification of available parking spaces by better tracking parking availability through selective activation of parking availability functions in connected vehicles are disclosed. As previously noted, locating parking can be a time-consuming task. For example, attempting to park in a nearly full parking garage can seem like an impossible task when there is no direction as to where available spaces may be. Similarly, locating street parking in a busy area can be a frustrating task, especially when considering the presence of traffic that may further complicate movements through an area. As a result, a driver may become frustrated and waste a significant amount of time in the search for parking.

While some parking garages and parking lots may include infrastructure-based systems to identify available spots, such systems are generally expensive, complex to install and maintain, and do not resolve issues with street parking. Moreover, connected vehicles can scan parking areas and identify available parking spots; however, the connected vehicles consume considerable resources (e.g., computational resources, energy, communication bandwidth, etc.) when continuously providing functions that involve active monitoring through machine perception, which is generally undesirable especially when the resources could otherwise be leveraged for improved safety or other functions of the instant vehicle.

Therefore, in various arrangements, disclosed systems and methods improve the identification of available parking spaces by focusing resources of connected vehicles within areas lacking available parking as opposed to broadly sensing availability without consideration to the use of resources. For example, in at least one arrangement, a parking system acquires information about vehicles traveling throughout a geographic area. In general, acquiring the information is less involved (i.e., less resource-intensive) than what may be involved with active monitoring of an area using explicit parking availability functions within a vehicle. For example, the information includes at least coarse trajectory data along with location information about the movements of the vehicle. Of course, in further arrangements, the information may include additional data, such as telematics data indicating more particular aspects of operation of the vehicle (e.g., vehicle on/off, operating conditions, speeds, etc.).

In any case, the parking system receives the noted information from vehicles moving throughout a geographical region and analyzes the information to identify locations that lack available parking so that the parking system can determine whether an associated region should be activated for the use of more robust parking availability functions. The parking system may achieve this determination by deriving parking search times from the trajectory information. The parking search times generally characterize how long an individual vehicle spends seeking a parking spot. As one example, the parking system analyzes the information to identify when a vehicle starts searching and stops searching for a parking spot. The parking system may use different identifying characteristics depending on the particular pattern exhibited by the vehicle. For example, the parking system, in one approach, uses a time at which the vehicle is within a predefined distance of a destination, while, in further approaches, the parking system identifies the start time from when the vehicle enters a parking garage/lot, when the movement of the vehicle exhibits circling patterns, and so on. Additionally, the parking system determines the end time, in one approach, by determining when the vehicle stops moving for a defined period of time (e.g., 10 mins). In further approaches, the parking system determines the end time according to a vehicle off event, a transmission shifting to park, and so on.

Accordingly, the parking system may determine the search times and use the search times as an indicator of parking congestion in an area instead of wasting resources by causing vehicles to continuously implement more complex parking identification functions. If the search time satisfies the threshold, then the parking system can aggregate the search time as a parking event for an associated location. Thereafter, the parking system may perform an additional check to determine whether a particular location satisfies a parking threshold. The parking threshold indicates whether parking at the location can be considered difficult to park or congested. For example, in order to avoid spurious events and ensure proper characterization of a location, the parking threshold indicates a number of parking events over a sliding time window.

As such, when the parking system determines that a location satisfies the parking threshold, the parking system, in one or more arrangements, updates active regions of a parking map and provides the parking map to connected vehicles within a geographic area. Thus, when a region is active within the parking map, connected vehicles within the active region enable parking identification functions. The parking identification functions generally involve activating sensors within the connected vehicles to actively scan for available parking spaces by processing the sensor data using various perception algorithms (e.g., object detection and classification algorithms), which consume additional resources. However, because the parking system limits the activation of the parking identification functions to vehicles within the active regions, the connected vehicles can better focus resources and avoid wasting resources by continuously enabling such functions in areas where parking may be simple and may not benefit from this added functionality. In any case, the connected vehicles can then communicate locations of available parking to the parking system, which shares the information with other vehicles to better facilitate parking in congested locations. In this way, the parking system improves the identification of parking availability by selectively focusing resources on areas in which the additional parking information is needed.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100 is generally a connected vehicle that is capable of communicating wirelessly with other devices, such as other connected vehicles, infrastructure elements (e.g., roadside units), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a parking system 170 that is implemented to perform methods and other functions as disclosed herein relating to selectively activating parking availability functions.

Moreover, the parking system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the parking system 170 can leverage various wireless communication technologies to provide communications to other entities, such as members of the cloud-computing environment.

Figure 2:
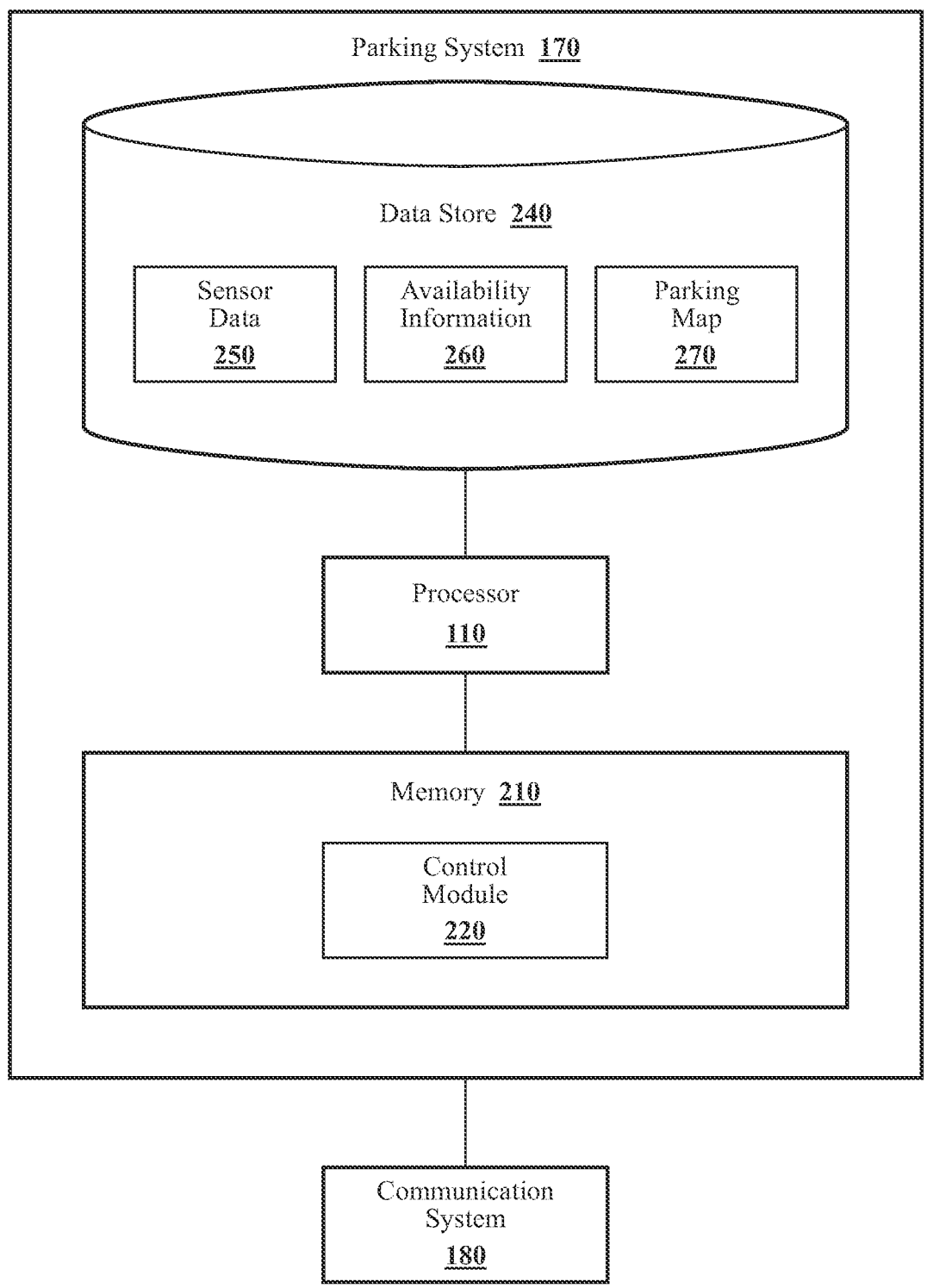
FIG. 2 illustrates one embodiment of a parking system associated with improving the identification of available parking spaces by selectively activating connected vehicles in areas of limited availability.

With reference to FIG. 2, one embodiment of the parking system 170 is further illustrated. The parking system 170 is shown as including a processor 110 from the vehicle 100 of FIG. 1. Accordingly, the processor 110 may be a part of the parking system 170, the parking system 170 may include a separate processor from the processor 110 of the vehicle 100 or the parking system 170 may access the processor 110 through a data bus or another communication path. In further aspects, the processor 110 is a cloud-based resource. Thus, the processor 110 may communicate with the parking system 170 through a communication network or may be co-located with the parking system 170. In one embodiment, the parking system 170 includes a memory 210 that stores a control module 220. The memory 210 is a random-access memory (RAM), read-only memory (ROM), a hard-disk drive, a flash memory, or other suitable memory (either volatile or non-volatile) for storing the modules 220 and 230 and/or other information used by the parking system 170. The modules 220 and 230 are, for example, computer-readable instructions within the physical memory 210 that, when executed by the processor 110, cause the processor 110 to perform the various functions disclosed herein.

Figure 3:
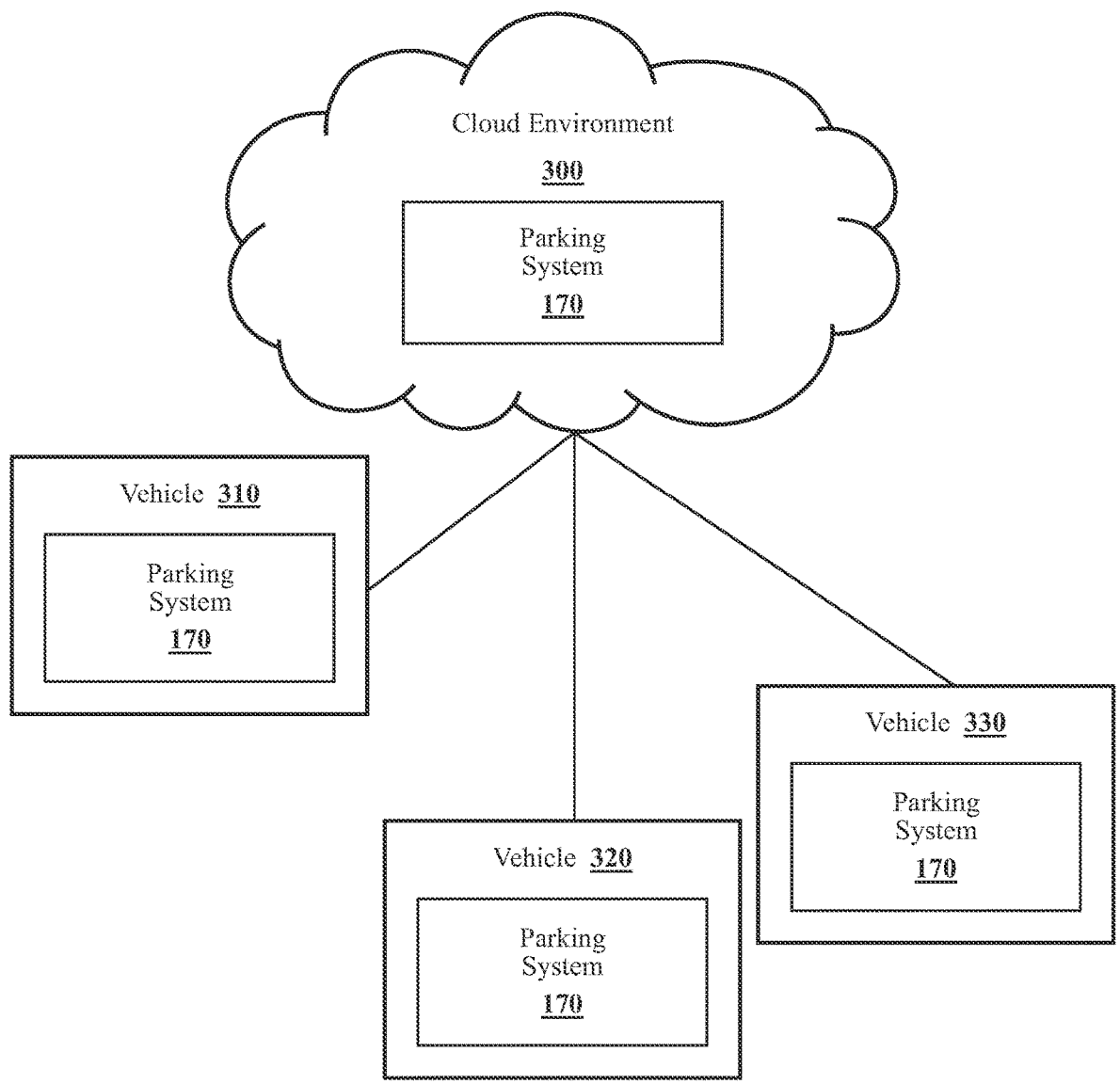
FIG. 3 illustrates a diagram of a parking system within a cloud-computing environment.

As previously noted, the parking system 170 may be further implemented within the vehicle 100 as part of a cloud-based system that functions within a cloud environment 300, as illustrated in relation to FIG. 3. That is, for example, the parking system 170 may acquire data (e.g., telematics data, sensor data, etc.) from various entities, such as distributed vehicles implementing separate instances of the parking system 170. In one or more approaches, the cloud environment 300 may facilitate communications between multiple different vehicles to acquire and distribute information regarding available parking as may be collected by one or more of the vehicles 310, 320, and 330 and disseminated to various vehicles seeking parking.

Accordingly, as shown, the parking system 170 may include separate instances within one or more entities of the cloud-based environment 300, such as servers, and also instances within vehicles that function cooperatively to acquire, analyze, and distribute the noted information. In a further aspect, the entities that implement the parking system 170 within the cloud-based environment 300 may vary beyond transportation-related devices and encompass mobile devices (e.g., smartphones), and other such devices that may be carried by an individual within a vehicle, and thereby can function in cooperation with the vehicle. Thus, the set of entities that function in coordination with the cloud environment 300 may be varied.

The cloud-based environment 300 itself, as previously noted, is a dynamic environment that comprises cloud members that are routinely migrating into and out of a geographic area. In general, the geographic area, as discussed herein, is associated with a broad area, such as a city and surrounding suburbs. As will be discussed in greater detail subsequently, the parking system 170, in at least one arrangement, divides the geographic area into regions and aggregates information received from vehicles according to region. In yet a further aspect, the parking system 170 defines active regions dynamically according to locations of vehicles that report extended parking search times. In such a case, the parking system 170 draws an active region according to locations of the reporting vehicles. Thus, the particular size and shape of the active region depends on locations of the reporting vehicles and is not confined to a predefined region. In any case, the area associated with the cloud environment 300 can vary according to a particular implementation but generally extends across a wide geographic area.

Continuing with FIG. 2 and a general embodiment of the parking system 170, in one or more arrangements, the parking system 170 includes a data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250, availability information 260, a parking map 270, and/or other information that is used by the module 220. It should be appreciated that while the data store 240 is shown as including the sensor data 250, the availability information 260, and the parking map 270, separate instances of the parking system 170 may implement the data store 240 to include different sets of information.

In any case, the control module 220 includes instructions that function to control the processor 110 to acquire the sensor data 250 and/or the availability information 260. Depending on the particular instance of the parking system 170 (i.e., within a vehicle versus within a cloud-based entity), acquiring the sensor data 250 and/or the availability information 260 may differ. For example, from the perspective of the vehicle 100, the control module 220 collects different data elements depending on whether the vehicle 100 is within an active region or another region that is not active. Additional aspects of the active regions will be discussed subsequently, however, it should be appreciated that the control module 220 references the parking map 270 to determine when to activate a parking availability function that causes the vehicle 100 to acquire the sensor data 250 in greater detail.

In the instance of the vehicle 100 operating within a region that is not active, as defined by the parking map 270, the control module 220 acquires the availability information 260 that can include trajectory information about movements of the vehicle 100, and, in further aspects, may also include telematics data. Thus, the trajectory information defines movements of the vehicle 100, such as turns, speed, braking events, and so on, along with a general location, as may be defined by GPS. Accordingly, the trajectory information defines a general route and basic characteristics of the route without including resource-intensive information, such as camera images, LiDAR point clouds, and so on, that may be acquired when performing techniques that involve machine perception of the surrounding environment. As noted, in further aspects, the control module 220 can also acquire telematics data that includes additional aspects about operation of the vehicle 100, such as vehicle events (e.g., on/off events, transmission shifting events, etc.) and other general attributes about operation of the vehicle 100.

Once the control module 220 acquires the availability information 260, the control module 220 communicates the availability information 260 to the cloud environment 300 where a further instance of the parking system 170 determines whether the availability information 260 indicates a lack of parking in a location. It should be appreciated that the vehicle 100 may selectively provide the availability information 260 at defined intervals or upon the occurrence of a particular event (e.g., a vehicle off event). Moreover, the control module 220 within the vehicle 100 may also process the availability information 260 locally to derive a search time that is communicated to the cloud instead of the availability information 260 itself.

Transitioning to the cloud-computing environment 300, the control module 220 within a device of the cloud environment 300, such as a server, receives the availability information from the vehicle 100. The control module 220, in at least one approach, then proceeds to analyze the availability information 260 to derive a search time that the vehicle 100 spent seeking a parking space in a location. In various approaches, the particular manner of determining the search time may vary but relies on identifying a start time and a stop time. The control module 220 may use contextual cues to determine when to define the start time and the stop time. For example, in some instances, the identification of the start time may be clear, such as when the availability information 260 includes data elements specifying when the vehicle 100 entered a parking garage, a parking lot, or another defined area for parking. Alternatively, or additionally, the control module 220 analyzes the availability information 260 for indicators about when the vehicle 100 is exhibiting a circling pattern that is indicative of searching for parking. For example, if the vehicle 100 circles about a destination or an area close to the destination, and then parks, then the control module 220 defines the start time as an initial point associated with the circling behavior. In yet a further aspect, the control module 220 defines the search start time according to when vehicle 100 is within a defined distance to a destination as may be determined according to, for example, navigation instructions.

To determine the end time of the search, the control module 220 analyze the availability information 260 to identify, for example, when the vehicle 100 is turned off, shifted into park, or otherwise exhibits behavior of being in a parked position (i.e., doesn't move for a defined amount of time). In this way, the control module 220 can define start and end times of a search for parking and thus derive a parking search time spent by the vehicle 100 searching for parking. It should be appreciated that other connected vehicles within a geographic area associated with the cloud-computing environment 300 also provide the availability information to the parking system 170. Accordingly, the parking system 170 evaluates separate information from different vehicles (e.g., vehicles 310, 320, and 330) that are within the same and/or different locations to identify trends in parking.

The parking system 170 uses the derived search times as a point of comparison against a time threshold. The time threshold generally defines an amount of time spent searching for a parking space that indicates parking may be lacking in a location. The parking system 170 may define the time threshold differently for different locations. For example, for an area with complex parking circumstances, such as a large parking garage or parking lot (e.g., at an airport), the parking system 170 may define the time threshold with consideration to time to traverse the parking facility experienced by vehicles when the facility is not lacking parking. In any case, the control module 220 compares the search time determined from the acquired availability information 260 with the time threshold associated with the location to determine if the search time satisfies (e.g., is greater than or equal to) the threshold. If not, then the control module 220 may discard or otherwise log the search time.

However, if the search time does satisfy the time threshold, then the control module 220 logs the search time as a parking event for the location and aggregates the search time with other parking events for the same location. In this way, the control module 220 can identify occurrences of a vehicle having difficulty parking and can track additional instances to infer when parking in a location is difficult to find. Moreover, by using the trajectory information/telematics data instead of leveraging active perception within the vehicles, the parking system facilitates conserving resources within the connected vehicles.

Continuing with operation of the control module 220 within the cloud-based entity, once the control module 220 aggregates the search times, the control module 220 periodically updates the parking map 270. The parking map 270 is a map of the geographic area in which the parking system 170 is actively monitoring parking availability. The parking map 270 includes, as will be discussed in greater detail subsequently, defined regions (e.g., grid cells) or simply locations of the parking events defined from the search times that satisfy the time threshold. Thus, when search times for a particular location satisfy a parking threshold, the control module 220 then updates the parking map 270 to reflect an active region associated with the search times.

To further explain the parking threshold, the control module 220 defines the parking threshold, in at least one arrangement, according to a sliding window of time (e.g., the prior 60 mins), and a number of occurrences for the parking events within the sliding window. In a further example, the control module 220 may average the search times over the sliding window to determine when an average time to park satisfies the parking threshold. Thus, when a multiplicity of vehicles report search times that indicate a difficulty of parking within the sliding window, then the control module 220 switches the associate region within the parking map 270 to an active region. The control module 220 then further provides (e.g., communicates) the parking map 270 to the connected vehicles, which use the parking map 270 to know in which locations the parking availability functions should be active.

Accordingly, when the vehicle 100 is traveling throughout the geographic area, the control module 220 within the vehicle 100 compares a current location against the parking map 270 to determine when the vehicle 100 passes into an active region. When in an active region, the control module 220 causes the vehicle 100 to activate the parking availability function. In various embodiments, the parking availability functions generally include actively identifying available parking spaces by using onboard sensors of the vehicle to acquire sensor data about a surrounding environment and analyzing the sensor data using various machine perception techniques. Thus, as a vehicle with this functionality navigates through an area of limited parking, the vehicle is using perceived information about the surroundings to identify locations of available parking spaces.

The parking availability function may be implemented as part of an automated driving module 160 or as part of the parking system 170. As one example, an implementation via the parking system 170 will be described briefly. In one arrangement, the control module 220 acquires the sensor data 250 aspects in a surrounding environment of the vehicle 100 to facilitate the operation of various systems of the vehicle 100, such as the automated driving module 160 (e.g., automated driving assistance systems (ADAS), semi-autonomous systems, fully autonomous systems, etc.), a navigation application, the parking availability function, and so on. In further instances, the control module 220 acquires the sensor data 250 about the operation of the vehicle 100 itself (e.g., trajectory data, system status information, diagnostic data, etc.), and other relevant operating characteristics that may inform determinations about parking availability.

Accordingly, the control module 220 generally includes instructions that cause the processor 110 to control one or more sensors of the vehicle 100 to generate an observation about the surrounding environment. Broadly, an observation, as acquired by the control module 220, is information about a particular driving environment (e.g., parking lot, roadway, etc.) and objects present in the driving environment as perceived by at least one sensor. Thus, the observation is generally a group of one or more data that are processed into a meaningful form.

The control module 220, in one embodiment, controls respective sensors of the vehicle 100 to provide the data inputs in the form of sensor data 250. The control module 220 may further process the sensor data 250 into separate observations of the surrounding environment. For example, the control module 220, in one approach, fuses data from separate sensors to provide an observation about a particular aspect of the surrounding environment. By way of example, the sensor data 250 itself, in one or more approaches, may take the form of separate images, radar returns, LiDAR returns, and so on. The control module 220 may derive determinations (e.g., location, trajectory, etc.) from the sensor data 250 and fuse the data for separately identified aspects of the surrounding environment, such as surrounding vehicles. The control module 220 may further extrapolate the sensor data 250 into an observation by, for example, correlating the separate instances of sensor data into a meaningful observation about the object beyond an instantaneous data point. For example, the control module 220 may track a surrounding vehicle over many data points to provide a trajectory or provide a determination about whether the vehicle is leaving a parking space.

Additionally, while the control module 220 is discussed as controlling the various sensors to provide the sensor data 250, in one or more embodiments, the module 220 can employ other techniques that are either active or passive to acquire the sensor data 250. For example, the control module 220 may passively sniff the sensor data 250 from a stream of electronic information provided by the various sensors or other modules/systems in the vehicle 100 to further components within the vehicle 100. Moreover, as noted, the control module 220 can undertake various approaches to fuse data from multiple sensors when providing the sensor data 250. Thus, the sensor data 250, in one embodiment, represents a combination of perceptions acquired from multiple sensors.

Of course, depending on the sensors that the vehicle 100 or other entity includes, the available sensor data 250 that the parking system 170 can harvest may vary. As one example, according to a particular implementation, the vehicle 100 may include different types of cameras or placements of multiple cameras. When acquiring the sensor data 250, the control module 220 may acquire various electronic inputs that originate from the vehicle 100, which may be stored in the data store 240 of the parking system 170 as the sensor data 250 and processed according to various algorithms, such as machine learning algorithms, heuristics, and so on. Accordingly, the parking system 170, in one approach, uses the noted sensor data 250 along with perceptions derived from the sensor data 250 to identify locations of available parking along streets, and within parking facilities.

The parking system 170 can then communicate the derived observations derived to the cloud-based environment 300 for dissemination back to vehicles that are presently seeking parking. The cloud-based environment 300 may also provide instructions to various connected vehicles to improve knowledge about available parking spaces, such as re-routing vehicles to observe particular areas (e.g., where available spaces were previously observed, etc.). As such, the resources expended by the connected vehicles in support of this functionality is substantial. Therefore, use of the parking availability functions in areas where locating parking is not burdensome is generally wasteful of the resources employed by the vehicles in support of the functions. This may be especially true in instances where the vehicle is an electric vehicle and energy is limited.

Figure 4:
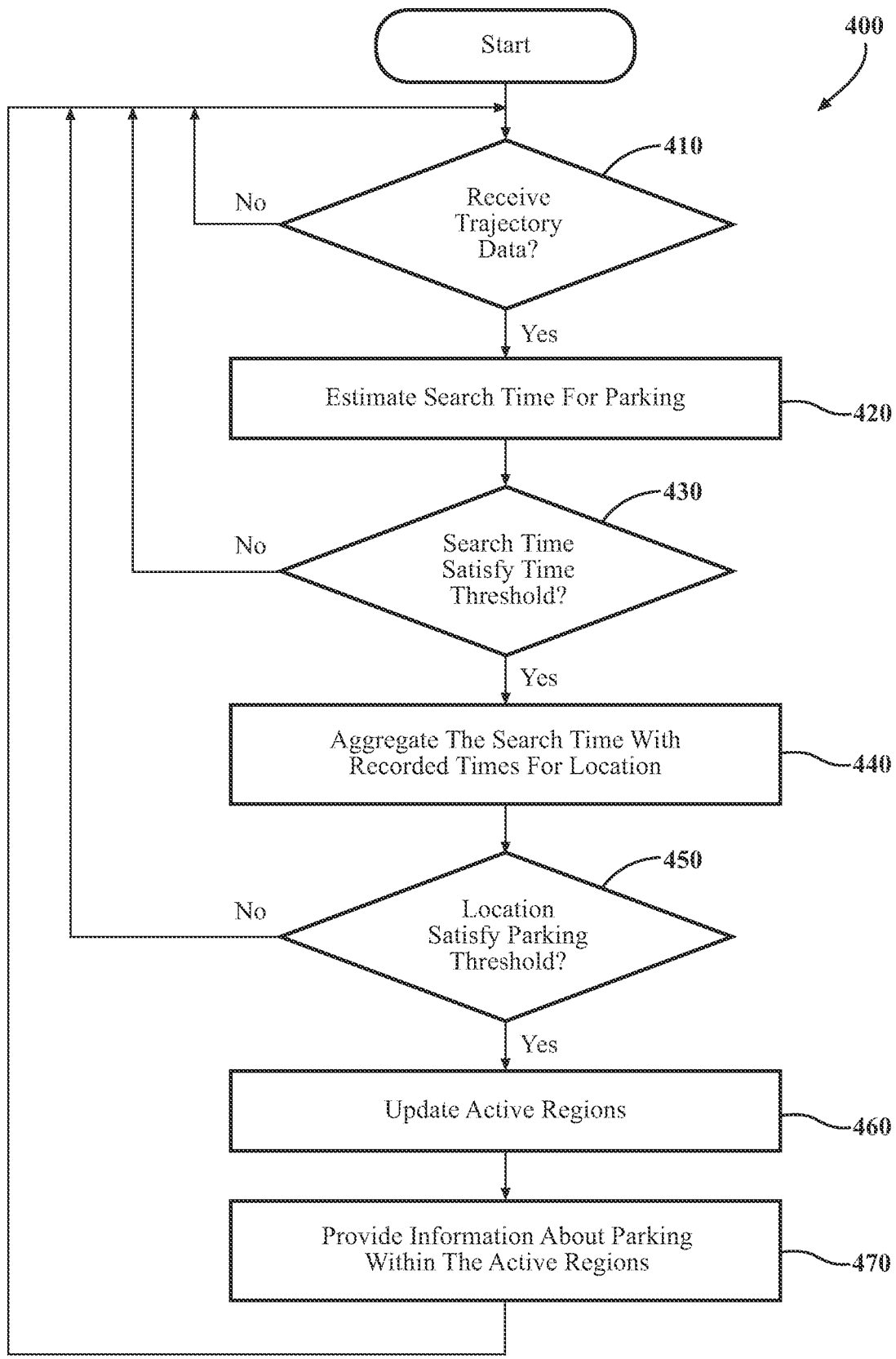
FIG. 4 is a flowchart illustrating one embodiment of a method associated with identifying active regions where parking is limited and updating a parking map accordingly.

Additional aspects about selective activation of parking availability functions according to active regions will be described in relation to FIG. 4. FIG. 4 illustrates a flowchart of a method 400 that is associated with identifying active regions where parking is limited and updating a parking map. Method 400 will be discussed from the perspective of the parking system 170 of FIGS. 1-2 as implemented by an entity, such as a server within the cloud-based environment 300. While method 400 is discussed in combination with the parking system 170, it should be appreciated that the method 400 is not limited to being implemented within the parking system 170 but is instead one example of a system that may implement the method 400. Furthermore, while the method is illustrated as a generally serial process, various aspects of the method 400 can execute in parallel to perform the noted functions.

At 410, the control module 220 receives availability information 260, which includes trajectory information about movement of a searching vehicle. The trajectory information includes at least a start time and a stop time associated with the searching vehicle seeking a parking spot. In particular, the trajectory information includes information from which the control module 220 can derive the start time and the stop time. Moreover, as previously noted, the availability information 260 may further include a full suite of telematics data that specifies additional aspects about operation of the vehicle 100, such as vehicle on/off events, and so on, thereby facilitating determination of the start and stop times.

At 420, the control module 220 estimates a search time spent by the vehicle 100 seeking parking in a location. In at least one approach, the control module 220 estimates the search time by identifying when the searching vehicle 100 begins seeking the parking spot as the start time and when the vehicle parks as the stop time. The start and stop times can be identified according to various criteria including identifying when the vehicle 100 begins a pattern of starts and stops indicating frequent maneuvering in a parking facility to identify a parking space, identifying when the vehicle 100 circles a same geographical area, identifying a distance to a destination satisfies a threshold (e.g., a predefined distance within which the vehicle 100 may begin seeking parking), and when the vehicle 100 enters a parking area. Similarly, the control module 220 determines a stop time for parking according to the availability information 260, such as a vehicle off event, a transmission shifting to park event, and so on. From these indicators, the control module 220 derives the search time.

At 430, the control module 220 determines whether the search time satisfies a time threshold. The time threshold indicates when the location has reached a level of availability for parking that prolongs finding available parking by the vehicle 100. For example, within the context of a parking garage, once the parking garage is full and only spots for vehicles that are leaving become available, the time to find parking significantly increases. Similarly, if a vehicle must traverse many levels of a parking garage (e.g., to a top level), then the time to find parking can also increase. Thus, the parking system 170 can define the time threshold to account for extending parking time and may further define the time threshold according to specific locations that may have additional traversal times associated with entering parking facilities.

At 440, the control module 220, aggregates the search time with observed times associated with additional entities parking in the location that was previously identified as satisfying the time threshold. Aggregating the search times provides a more comprehensive assessment of how many different vehicles are parking at the location and across multiple different parking facilities, such as multiple different parking garages, parking lots, street parking, and so on. Moreover, it should be noted that the observed times may be assessed over a sliding window of time (e.g., 30 mins, 60 mins, etc.) in order to provide a real-time view of changes in parking at a location.

At 450, the control module 220 determines whether a location satisfies a parking threshold indicating a lack of available parking in the location. As previously noted, the parking threshold may define either a number of occurrences of the search time of different vehicles satisfying the time threshold or an average time for the reported search times satisfying the parking threshold. Either indicator is representative of increased parking activity in a location. Moreover, while a location is broadly discussed, it should be appreciated that the location generally refers to a same region within the parking map 270, as will be discussed further along with FIGS. 6-7. In any case, the control module 220 analyzes the observed times, in one configuration, along with historical data about parking in the location to determine whether a location satisfies the parking threshold. Thus, the analysis in combination with the historical data can involve additional inferences where the observed times alone do not satisfy the parking threshold. For example, the historical data may include general parking demand according to previously observed demand, the occurrence of events, and so on within the location. As such, the control module 220 may adjust the observed times by a historical prediction factor (e.g., increase the observed time according to inferred upcoming demand) in order to better predict parking demand in the location. Accordingly, when the aggregated search times satisfy the parking threshold, the control module 220 proceeds to update the parking map at 460. Otherwise, the parking system 170 continues to monitor the search times.

At 460, the control module 220 updates the parking map 270 according to the observed times. The parking map 270 identifies active regions where parking is presently lacking/unavailable in order to inform connected vehicles about areas where the parking availability functions are to be active. The identification of the active regions can vary according to a particular implementation, as previously noted. For example, the geographic area can be divided using a grid into separate grid cells. Thus, when a particular cell associated with search times satisfies the parking threshold, the control module 220 changes an annotation within the parking map 270 to indicate the cell as being an active region. In further aspects, the definition of active regions may be amorphous in that the control module 220 identifies particular locations associated with the search times and forms a region about the times to cluster the occurrences together.

At 470, the control module 220 provides the parking map 270 with the active regions to identified vehicles proximate to locations associated with the active regions. In one or more arrangements, the control module provides the parking map 270 by periodically communicating the parking map 270 to vehicles within the geographic area associated with the active regions. In still further approaches, the control module 220 may provide the parking map 270 whenever a region is updated to an active status or deactivated to non-active (i.e., when the observed times no longer satisfy the parking threshold and/or according to a cool-down period). In any case, communicating the parking map 270 to the vehicles causes the vehicles to actively sense available parking spaces in the active regions and communicate the available spaces back to the cloud-based environment 300 to facilitate parking by subsequent vehicles.

The vehicles can then leverage the parking map 270 to determine when the parking availability functions are to be activated and can thereby conserve resources by disabling the parking identification functions in non-active zones. As noted, the acquired information about available parking can then be disseminated to vehicles that are within the active regions either separately or as part of the parking map 270 in order to inform vehicles seeking parking where spaces are likely available.

Figure 5:
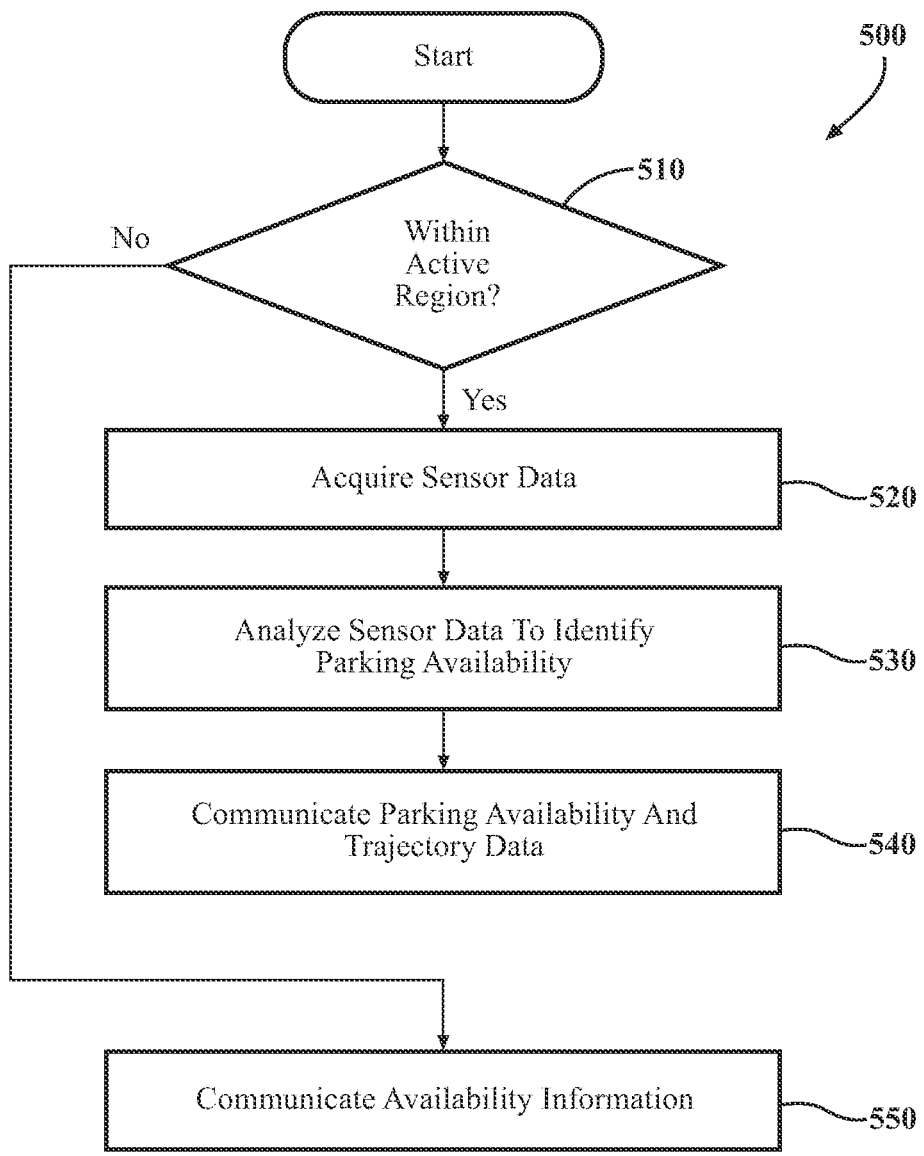
FIG. 5 is a flowchart illustrating one embodiment of selectively analyzing parking locations for availability.

FIG. 5 illustrates a flowchart of a method 500 that is associated with selectively activating parking availability functions in a connected vehicle. Method 500 will be discussed from the perspective of the parking system 170 of FIGS. 1-2 as implemented by a vehicle, such as the vehicle 100. While method 500 is discussed in combination with the parking system 170, it should be appreciated that the method 500 is not limited to being implemented within the parking system 170 but is instead one example of a system that may implement the method 500. Furthermore, while the method is illustrated as a generally serial process, various aspects of the method 500 can execute in parallel to perform the noted functions.

At 510, the parking system 170 determines whether the vehicle 100 is currently within an active region as defined by the parking map 270. In one or more arrangements, the control module 220 determines a location of the vehicle 100 by referencing information from a GPS or another location-identifying sensor and compares the location against the parking map 270. The comparison identifies a current region of the vehicle against the parking map 270 and whether the current region is active or not. When the vehicle 100 is not within an active zone, then the control module 220 proceeds to communicate the availability information 260 as discussed at 550. Otherwise, the control module activates the parking availability function, as discussed further at blocks 520-540.

At 520, the control module 220 acquire the sensor data 250 about surroundings of the vehicle 100. The sensor data 250 embodies observations of the surroundings that include information about available parking spaces. As previously explained, the sensor data 250 can include information from a suite of different sensors that facilitates capturing a comprehensive observation of the surrounding environment.

At 530, the control module 220 analyzes the sensor data 250 to identify parking availability. In various arrangements, the control module 220 processes the sensor data 250 using various algorithms to detect objects and aspects of the environment, classify the objects, and determine the presence of parked vehicles and free spaces for parking in the surrounding environment. In practice, the process of identifying available parking may include analysis of various contextual aspects, such as sizes of spaces, the presence of signs indicating rules/laws about parking, and so on. In any case, through the analysis of the sensor data 250, the control module 220 is able to identify locations of available parking.

At 540, the control module 220 communicates the available parking space locations to the cloud-based environment 300. In various arrangements, the control module 220 communicates via a cellular communication link to provide the observed information, which may then be provided back to other vehicles to facilitate parking.

At 550, the control module 220 communicates the availability information 260 to the cloud-based environment 300. As noted previously, the availability information 260 includes at least trajectory information about a path of the vehicle 100 so that an entity in the cloud-based environment 300 can determine whether the vehicle 100 encounters difficulty parking as derived from the availability information. Accordingly, the vehicle 100 provides a different set of information depending on whether the vehicle 100 is currently operating in an active region or not. In this way, the vehicle 100 can conserve resources and avoid additional processing and additional communications when operating outside of regions that are active.

Figure 6:
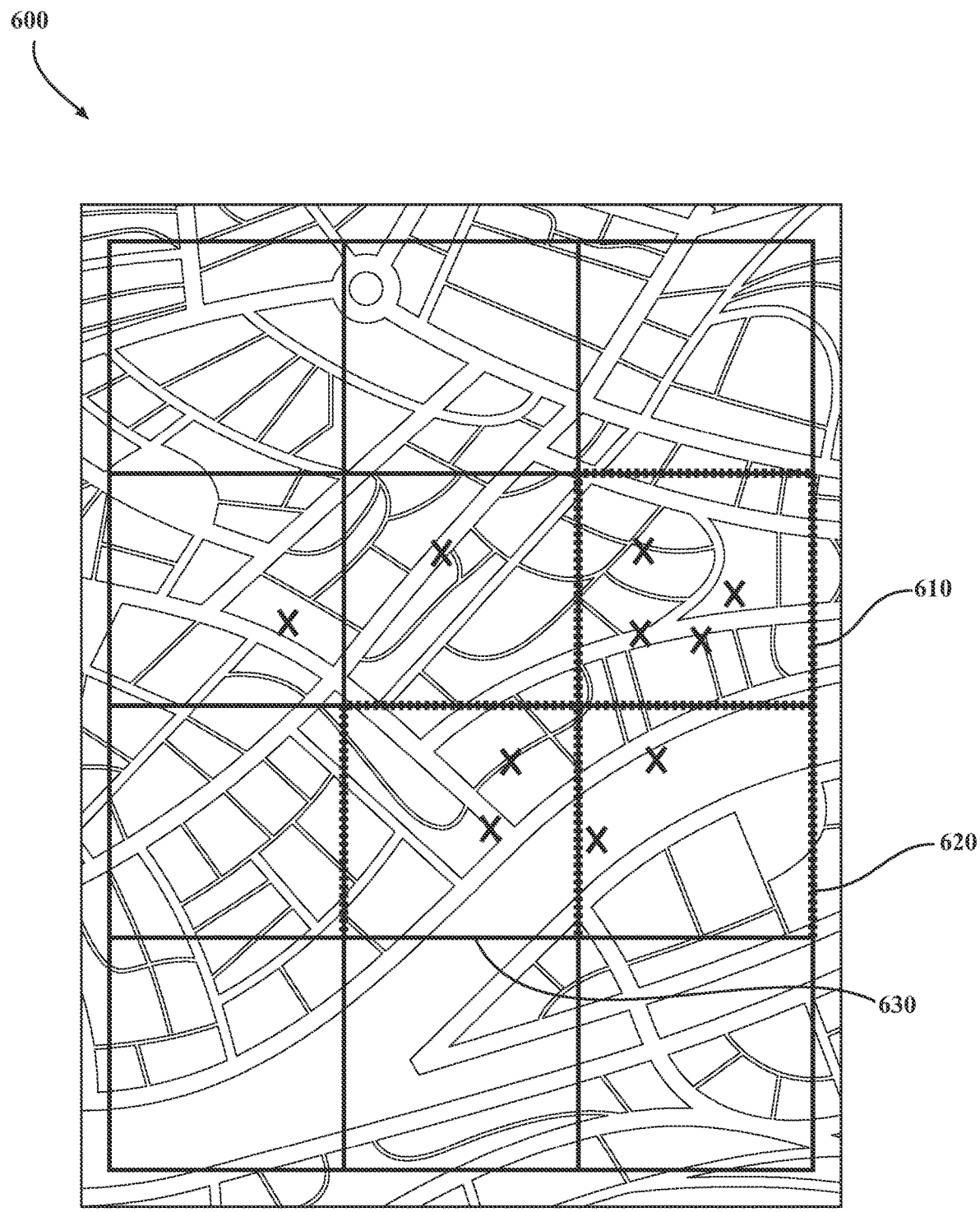
FIG. 6 is an illustration of a parking map divided into subregions, including multiple active regions.

As a further explanation of the parking system 170, reference will now be made to FIGS. 6-7. FIG. 6 illustrates an example geographic area 600 that is divided according to a grid. The X's identify locations where a vehicle has reported a search time that the parking system 170 determines to satisfy the time threshold. Moreover, grid cells 610, 620, and 630 are active regions since the parking system 170 has determined that the observed times included therein satisfy the parking threshold. Thus, connected vehicles travelling within the active regions 610, 620, and 630 are induced to activate parking availability functions so that the parking system 170 can provide assistance to other vehicles in finding parking.

Figure 7:
FIG. 7 is an illustration of a parking map divided according to clustering.

FIG. 7 illustrates another example of a geographic area 700 except the area 700 is not divided into grid cells. Instead, the parking system 170 clusters the observed times. For example, the parking system can dynamically generate amorphous active regions instead of using predefined sub-regions in order to better capture areas with difficulty parking. As shown, the parking system 170 applies a clustering algorithm to the locations where parking delay events have been identified from reported search times. According to the clustering, the parking system 170 defines the active region to encompass as many of the parking events as is reasonable without unnecessarily bounding regions without activity. Thus, as shown in FIG. 7, the parking system 170 defines an active region 710 that encompasses parking events that are generally close in proximity to each other without over-extending the active region 710 to capture parking events that are far away from the primary group.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the parking system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the parking system 170, and/or the automated driving module(s) 160 can be in communication to send and/or receive information from the various vehicle systems 140 to control the movement, speed, maneuvering, heading, direction, etc. of the vehicle 100. The processor(s) 110, the parking system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the parking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A parking system for improving identification of available parking spaces in congested zones, comprising:
   one or more processors; and
   a memory communicably coupled to the one or more processors and storing:
      a control module including instructions that when executed by the one or more processors cause the one or more processors to:

responsive to receiving trajectory information about movement of a searching vehicle, estimate a search time spent by the searching vehicle seeking parking in a location;

aggregate, when the search time satisfies a time threshold, the search time with observed times associated with additional entities parking in the location;

update a parking map according to the observed times when the observed times satisfy a parking threshold indicating a lack of available parking in the location, wherein the parking map identifies active regions where parking is presently lacking; and provide the parking map with the active regions to identified vehicles proximate to locations associated with the active regions, including instructions to communicate the parking map to the identified vehicles to cause the identified vehicles to actively sense available parking spaces in the active regions by activating at least one sensor and machine perception in the identified vehicles and communicate the available parking spaces to facilitate parking by subsequent vehicles, wherein the control module includes instructions to provide the parking map causes respective ones of the identified vehicles within the active regions to activate parking identification functions and respective ones of the identified vehicles not within the active regions to conserve resources by disabling the parking identification functions.

2. The parking system of claim 1, wherein the control module includes instructions to receive the trajectory information including instructions to receive at least a start time and a stop time associated with the searching vehicle seeking a parking spot in one of a parking lot, a parking garage, and street parking.

3. The parking system of claim 2, wherein the control module includes instructions to estimate the search time including instructions to identify when the searching vehicle begins seeking the parking spot as the start time and when the searching vehicle parks as the stop time, including identifying the start time as at least one of: identifying when the searching vehicle begins a pattern of starts and stops, identifying when the searching vehicle circles a same geographical area, a distance to a destination satisfies a threshold, and when the searching vehicle enters a parking area.

4. The parking system of claim 1, wherein the control module includes instructions to aggregate the search time with observed times including instructions to determine whether the search time satisfies the time threshold that indicates when the location has reached a level of availability for parking that prolongs finding available parking.

5. The parking system of claim 1, wherein the control module includes instructions to update the parking map including instructions to define subregions over a geographical area with the location being associated with a respective one of the subregions and applying a sliding window of time to the observed times of the subregions to determine when an average time to park over the sliding window satisfies the parking threshold, and wherein the control module includes instructions to update the parking map including instructions to identify the active regions as respective ones of the subregions that satisfy the parking threshold.

6. The parking system of claim 1, wherein the control module includes instructions to provide the parking map including instructions to communicate space information that identifies locations of available parking spaces in the location according to acquired information from the location.

7. The parking system of claim 1, wherein the control module includes instructions to update the parking map including instructions to analyze the observed times in combination with historical data about parking in subregions to determine whether respective ones of the subregions satisfy the parking threshold.

8. A non-transitory computer-readable medium storing instructions for improving identification of available parking spaces in congested zones and that, when executed by one or more processors, cause the one or more processors to:

responsive to receiving trajectory information about movement of a searching vehicle, estimate a search time spent by the searching vehicle seeking parking in a location;

aggregate, when the search time satisfies a time threshold, the search time with observed times associated with additional entities parking in the location;

update a parking map according to the observed times when the observed times satisfy a parking threshold indicating a lack of available parking in the location, wherein the parking map identifies active regions where parking is presently lacking; and provide the parking map with the active regions to identified vehicles proximate to locations associated with the active regions, including instructions to communicate the parking map to the identified vehicles to cause the identified vehicles to actively sense available parking spaces in the active regions by activating at least one sensor and machine perception in the identified vehicles and communicate the available parking spaces to facilitate parking by subsequent vehicles, wherein the instructions to provide the parking map include instructions to cause respective ones of the identified vehicles within the active regions to activate parking identification functions and respective ones of the identified vehicles not within the active regions to conserve resources by disabling the parking identification functions.

9. The non-transitory computer-readable medium of claim 8, wherein the instructions include instructions to receive the trajectory information including instructions to receive at least a start time and a stop time associated with the searching vehicle seeking a parking spot in one of a parking lot, a parking garage, and street parking.

10. The non-transitory computer-readable medium of claim 9, wherein the instructions include instructions to estimate the search time including instructions to identify when the searching vehicle begins seeking the parking spot as the start time and when the searching vehicle parks as the stop time, including identifying the start time as at least one of: identifying when the searching vehicle begins a pattern of starts and stops, identifying when the searching vehicle circles a same geographical area, a distance to a destination satisfies a threshold, and when the searching vehicle enters a parking area.

11. The non-transitory computer-readable medium of claim 8, wherein the instructions include instructions to aggregate the search time with observed times including instructions to determine whether the search time satisfies the time threshold that indicates when the location has reached a level of availability for parking that prolongs finding available parking.

12. The non-transitory computer-readable medium of claim 8, wherein the instructions include instructions to update the parking map including instructions to define subregions over a geographical area with the location being associated with a respective one of the subregions and applying a sliding window of time to the observed times of the subregions to determine when an average time to park over the sliding window satisfies the parking threshold, and
    wherein the instructions include instructions to update the parking map including instructions to identify the active regions as respective ones of the subregions that satisfy the parking threshold.

13. A method, comprising:
responsive to receiving trajectory information about movement of a searching vehicle, estimating a search time spent by the searching vehicle seeking parking in a location;
aggregating, when the search time satisfies a time threshold, the search time with observed times associated with additional entities parking in the location;
updating a parking map according to the observed times when the observed times satisfy a parking threshold indicating a lack of available parking in the location, wherein the parking map identifies active regions where parking is presently lacking; and
providing the parking map with the active regions to identified vehicles proximate to locations associated with the active regions, including externally communicating the parking map to the identified vehicles that are remote to cause the identified vehicles to activate a sensor and machine perception and communicate available parking spaces to facilitate parking.

14. The method of claim 13, wherein receiving the trajectory information includes receiving at least a start time and a stop time associated with the searching vehicle seeking a parking spot in one of a parking lot, a parking garage, and street parking.

15. The method of claim 14, wherein estimating the search time includes identifying when the searching vehicle begins seeking the parking spot as the start time and when the vehicle parks as the stop time, including identifying the start time as at least one of: identifying when the searching vehicle begins a pattern of starts and stops, identifying when the searching vehicle circles a same geographical area, a distance to a destination satisfies a threshold, and when the searching vehicle enters a parking area.

16. The method of claim 13, wherein aggregating the search time with observed times includes determining whether the search time satisfies the time threshold that indicates when the location has reached a level of availability for parking that prolongs finding available parking.

17. The method of claim 13, wherein updating the parking map includes defining subregions over a geographical area with the location being associated with a respective one of the subregions and applying a sliding window of time to the observed times of the subregions to determine when an average time to park satisfies the parking threshold, and
    wherein updating the parking map includes identifying the active regions as respective ones of the subregions that satisfy the parking threshold.

18. The method of claim 13, wherein providing the parking map includes causing the vehicles to actively sense available parking spaces by activating at least a camera within the identified vehicles, and
    wherein providing the parking map causes respective ones of the identified vehicles within the active regions to activate parking identification functions and respective ones of the identified vehicles not within the active regions to conserve resources by disabling the parking identification functions.

19. The method of claim 13, wherein providing the parking map includes communicating space information that identifies locations of available parking spaces in the location according to acquired information from the location, and
    wherein updating the parking map includes analyzing the observed times in combination with historical data about parking in subregions to determine whether respective ones of the subregions satisfy the parking threshold.

* * * * *